United States Patent
Bahr et al.

(10) Patent No.: US 11,470,477 B2
(45) Date of Patent: Oct. 11, 2022

(54) USING MULTIPLE RADIO DATA STREAMS TO THWART MAN-IN-THE-MIDDLE ATTACKS

(71) Applicant: CABLE TELEVISION LABORATORIES, INC., Louisville, CO (US)

(72) Inventors: John C. Bahr, Superior, CO (US); David Daniel Smith, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 559 days.

(21) Appl. No.: 16/543,350

(22) Filed: Aug. 16, 2019

(65) Prior Publication Data
US 2020/0077272 A1    Mar. 5, 2020

Related U.S. Application Data

(60) Provisional application No. 62/719,073, filed on Aug. 16, 2018.

(51) Int. Cl.
| | |
|---|---|
| *H04W 12/122* | (2021.01) |
| *H04B 7/0413* | (2017.01) |
| *H04W 4/06* | (2009.01) |
| *H04W 8/18* | (2009.01) |
| *G01S 3/50* | (2006.01) |
| *H04W 84/12* | (2009.01) |
| *H04W 88/08* | (2009.01) |
| *H04W 12/63* | (2021.01) |

(52) U.S. Cl.
CPC ........ *H04W 12/122* (2021.01); *H04B 7/0413* (2013.01); *H04W 4/06* (2013.01); *H04W 8/18* (2013.01); *G01S 3/50* (2013.01); *H04W 12/63* (2021.01); *H04W 84/12* (2013.01); *H04W 88/08* (2013.01)

(58) Field of Classification Search
CPC ....... H04W 12/122; H04W 4/06; H04W 8/18; H04W 12/63; H04W 84/12; H04W 88/08; H04W 12/73; H04B 7/0413; G01S 3/50; H04L 63/18
See application file for complete search history.

(56) References Cited

U.S. PATENT DOCUMENTS

| | | | |
|---|---|---|---|
| 8,484,460 B1* | 7/2013 | Vaughn | H04L 63/1466 726/28 |
| 2010/0067504 A1* | 3/2010 | Chen | H04L 63/1408 455/410 |
| 2016/0142158 A1* | 5/2016 | Li | H04L 5/0023 455/63.1 |

* cited by examiner

*Primary Examiner* — Vineeta S Panwalkar
(74) *Attorney, Agent, or Firm* — David Daniel Smith (57) ABSTRACT

The present disclosure generally relates to apparatus, software and methods for thwarting radio spoofing techniques by requiring and sending data from multiple radios positioned such that the receiving client can determine that it came from multiple spatially separated radios due to the Angle of Arrival of each radio's signal.

20 Claims, 9 Drawing Sheets

USING MULTIPLE RADIO DATA STREAMS TO THWART MAN-IN-THE-MIDDLE ATTACKS

CROSS-REFERENCE TO RELATED APPLICATIONS

This application claims the benefit of and priority to U.S. Provisional Patent Application No. 62/719,073, filed Aug. 16, 2018, which is hereby incorporated by reference in its entirety.

STATEMENT REGARDING FEDERALLY SPONSORED RESEARCH

None.

BACKGROUND

Man-in-the-middle (MITM) attacks are easy to execute in Wi-Fi networks—all the attacker needs is an access point (AP) with some easily available software and a laptop. MITM attacks are executed by tricking the Wi-Fi client into associating to the attackers AP instead of the legitimate network APs.

SUMMARY

The present disclosure generally relates to apparatus, software and methods for thwarting MITM attacks. The disclosed apparatus, software and methods achieve this objective by notifying a receiving device, such as but not limited to a Wi-Fi, 3g/4g/5G, 5G NR-U, etc. client, that a transmission, such as but not limited to a downlink data transmission, will be partitioned into a predetermined number of signals transmitted from multiple spatially separated access points. Using a multiple input, multiple output (MIMO) device having two or more antennas or an antenna array, a client can determine the number of signals transmitted and aspect related to those transmissions, for example, their times of arrival, angles of arrival, etc. Transmissions containing an incorrect number of signals and/or spatially, temporally or spatiotemporally uniform signals can be identified as attempted MITM attacks, and optionally rejected by the client. Also, once an access points (AP) is identified as transmitting a valid signal, the client can safely associate with the validated AP.

In an exemplary embodiment, a system of N APs (N>=2) is controlled by a common controller that allows downlink (DL) data sent to a station (STA) to be split across N APs. An ID, for example a vendor specific ID or an ID scheme defined by a standards body (e.g., IEEE), in each of the Beacon frames of the APs specifies how many APs will be transmitting to the STA in this system. All of the APs in the system will behave as split media access control (MAC)/physical (PHY) layers, i.e., they will all appear to have the same MAC and will all be operating on the same channel. As is known in the art, a multiple input, multiple output (MIMO) STA is capable of determining the Angle of Arrival (AoA) of a signal. From these pieces of data a STA can determine that the Beacon frames transmitted by each AP in a network of APs arrive at the STA at different angles, and therefore the AP's are spatially separated. Thus, the transmissions are not from a single source, i.e., a MITM AP. Therefore the STA can safely associate to one or more of the network APs. In addition, and for the same reasons, any downlink (DL) data frames received by the STA are coming from different directions, and not from a single MITM AP, and therefore can be safely accepted.

In an aspect, a method of using multiple radio data streams to thwart MITM transmissions comprises broadcasting a quantity of multiple radio data streams that form a single data transmission, dividing the single data transmission into the quantity of multiple radio data streams, and transmitting the multiple radio data streams to a station through spatially separated radios such that when the station receives an incorrect quantity of radio data streams or spatially uniform radio data streams the station may identify the multiple radio data streams as comprising a MITM transmission. In an embodiment, the station rejects multiple radio data streams identified as comprising a MITM transmission.

In an embodiment, the quantity of multiple radio data streams is broadcast as Beacon frame information.

In an embodiment, the method of using multiple radio data streams to thwart MITM transmissions is implemented at a headend of a hybrid fiber coaxial network, in a citizens' broadband radio service (CBRS) network, in a scheduled or partially scheduled unlicensed spectrum network (e.g. Wi-Fi, 5g-NRU, or the like), or in a mobile network.

In an embodiment, the step of dividing comprises partitioning the single data stream with a Wireless Controller, Cable Modem Termination System (CMTS), Wireless Access Gateway, Serving Gateway or PDN Gateway. The radio data stream could be divided at the IP, MAC layer, or PHY layer. For example, every $n^{th}$ byte or bit could be routed sequentially or randomly to an access point of the network.

In an embodiment, the multiple radio data streams are transmitted simultaneously or temporally staggered.

In an embodiment, the station is a MIMO station. In an embodiment, the station comprises a multidirectional antenna or a plurality of antennas.

In an embodiment, the spatially separated radios are access points in a wireless computing network. For example, the wireless computing network may be an Institute of Electrical and Electronics Engineers 802.11 wireless computing network.

In an embodiment, the spatially separated radios operate on the same channel. In an embodiment, the spatially separated radios have the same service set identifier (SSID).

In an embodiment, a method of using multiple radio data streams to thwart MITM transmissions comprises determining time delays of arrival or angles of arrival, at a station, of at least two of the multiple radio data streams.

In an embodiment, a method of using multiple radio data streams to thwart MITM transmissions further comprises a step of accepting the multiple radio data streams at a station when (i) the quantity of multiple radio data streams broadcast equals the quantity of multiple radio data streams received by the station; (ii) all of the multiple radio data streams have the same SSID; (iii) time delays of arrival or angles of arrival of the multiple radio data streams at the station are different and expected; or (iv) any combination of (i), (ii) and (iii).

In an embodiment, a method of using multiple radio data streams to thwart MITM transmissions further comprises identifying the radios sending the multiple radio data streams accepted by the station as approved access points; associating the station with at least one of the approved access points; and transmitting uplink traffic from the station to the at least one approved access point.

In an aspect, a non-transitory computer-readable medium has a plurality of non-transitory instructions executable with a processor for using multiple radio data streams to thwart MITM transmissions, the plurality of non-transitory instructions being executable for broadcasting a quantity of multiple radio data streams that form a single data transmission; dividing the single data transmission into the quantity of multiple radio data streams; and transmitting the multiple radio data streams to a station through spatially separated radios such that when the station receives an incorrect quantity of radio data streams or spatially uniform radio data streams the station rejects the multiple radio data streams as comprising a MITM transmission.

In an embodiment, the non-transitory computer-readable medium further comprises non-transitory instructions executable for transmitting the multiple radio data streams simultaneously or temporally staggered.

In an embodiment, the non-transitory computer-readable medium further comprises non-transitory instructions executable for determining time delays of arrival or angles of arrival, at the station, of at least two of the multiple radio data streams.

In an embodiment, the non-transitory computer-readable medium further comprises non-transitory instructions executable for accepting the multiple radio data streams at the station when (i) the quantity of multiple radio data streams broadcast equals the quantity of multiple radio data streams received by the station; (ii) all of the multiple radio data streams have the same SSID; (iii) time delays of arrival or angles of arrival of the multiple radio data streams at the station are different and expected; or (iv) any combination of (i), (ii) and (iii).

In an embodiment, the non-transitory computer-readable medium further comprises non-transitory instructions executable for identifying the radios sending the multiple radio data streams accepted by the station as approved access points; associating the station with at least one of the approved access points; and transmitting uplink traffic from the station to the at least one approved access point.

In an aspect, a system for generating multiple radio data streams to thwart MITM transmissions comprises a controller comprising a processor, memory, and a plurality of non-transitory instructions stored in the memory and executable by the processor for determining a quantity of multiple radio data streams that form a single data transmission, an inverse multiplexer or a switch operably connected to the controller for partitioning the single data transmission into the quantity of multiple radio data streams, and a transmitter operably connected to the controller, the inverse multiplexer or the switch, wherein the transmitter is configured to broadcast the quantity of multiple radio data streams and to transmit the multiple radio data streams to a plurality of spatially separated radios.

In an embodiment, a system further comprises a station comprising a plurality of antennas or a multidirectional antenna for receiving the multiple radio data streams from the spatially separated radios.

In an embodiment, a system further comprises a processor, memory and a plurality of non-transitory instructions stored in the memory and executable by the processor for rejecting the multiple radio data streams, as comprising a MITM transmission, when the station receives an incorrect quantity of radio data streams or spatially uniform radio data streams.

In an embodiment, a system further comprises a processor, memory and a plurality of non-transitory instructions stored in the memory and executable by the processor for accepting the multiple radio data streams when (i) the quantity of multiple radio data streams broadcast equals the quantity of multiple radio data streams received by the station; (ii) all of the multiple radio data streams have the same SSID; (iii) times/angles of arrival of the multiple radio data streams at one station antenna are different and expected; or (iv) any combination of (i), (ii) and (iii).

BRIEF DESCRIPTION OF THE DRAWINGS

Illustrative embodiments of the present invention are described in detail below with reference to the attached drawings, wherein.

DETAILED DESCRIPTION

In general, the terms and phrases used herein have their art-recognized meaning, which can be found by reference to standard texts, journal references and contexts known to those skilled in the art. The following definitions are provided to clarify their specific use in the context of this description.

As used herein, the term "network" refers generally to any type of telecommunications or data network including, without limitation, hybrid fiber coaxial (HFC) networks, satellite networks, telco networks, and data networks (including metropolitan area networks (MANs), wide area networks (WANs), local area networks (LANs), wireless local-area networks (WLANs), internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, a station (STA) or client is any device that contains an IEEE 802.11-conformant media access control (MAC) and physical layer (PHY) interface to a wireless medium. For example, a station may be a laptop, a desktop computer, or a Wi-Fi phone.

As used herein, an access point (AP) is a networking hardware device that allows stations to connect to a wired network.

As used herein, a Beacon frame is one of the management frames in IEEE 802.11 based wireless local area networks (WLANs) that contains all the information about the network. Beacon frames are transmitted periodically by APs to announce the presence of a wireless LAN and to synchronise the members of the service set.

A basic service set identifier (BSSID) describes a section of an 802.11 WLAN. A BSSID is the MAC address for the AP's radio within the service set.

As used herein, a "data stream" is a sequence of digitally encoded coherent signals used to transmit or receive information that is in the process of being transmitted.

As used herein, the term "channel" or "communication channel" refers to a physical transmission medium, such as a wire or optical cable, or a designated non-tangible broadcast medium, such as a wavelength used to convey an information signal from a sender(s) to a receiver(s). A channel has a certain capacity for transmitting information, often measured by its bandwidth in Hz or its data rate in bits per second.

As used herein, multiple input, multiple output (MIMO) describes an antenna technology for wireless communications in which multiple antennas are used at both the source (transmitter) and the destination (receiver).

As used herein, Angle of Arrival (AoA) refers to the direction of propagation of a radio-frequency wave incident on an antenna array. In an embodiment, an AoA is determined by measuring the time difference of arrival (TDOA) at individual elements of the array by measuring the difference in received phase at each element in the antenna array.

Figure 1A:
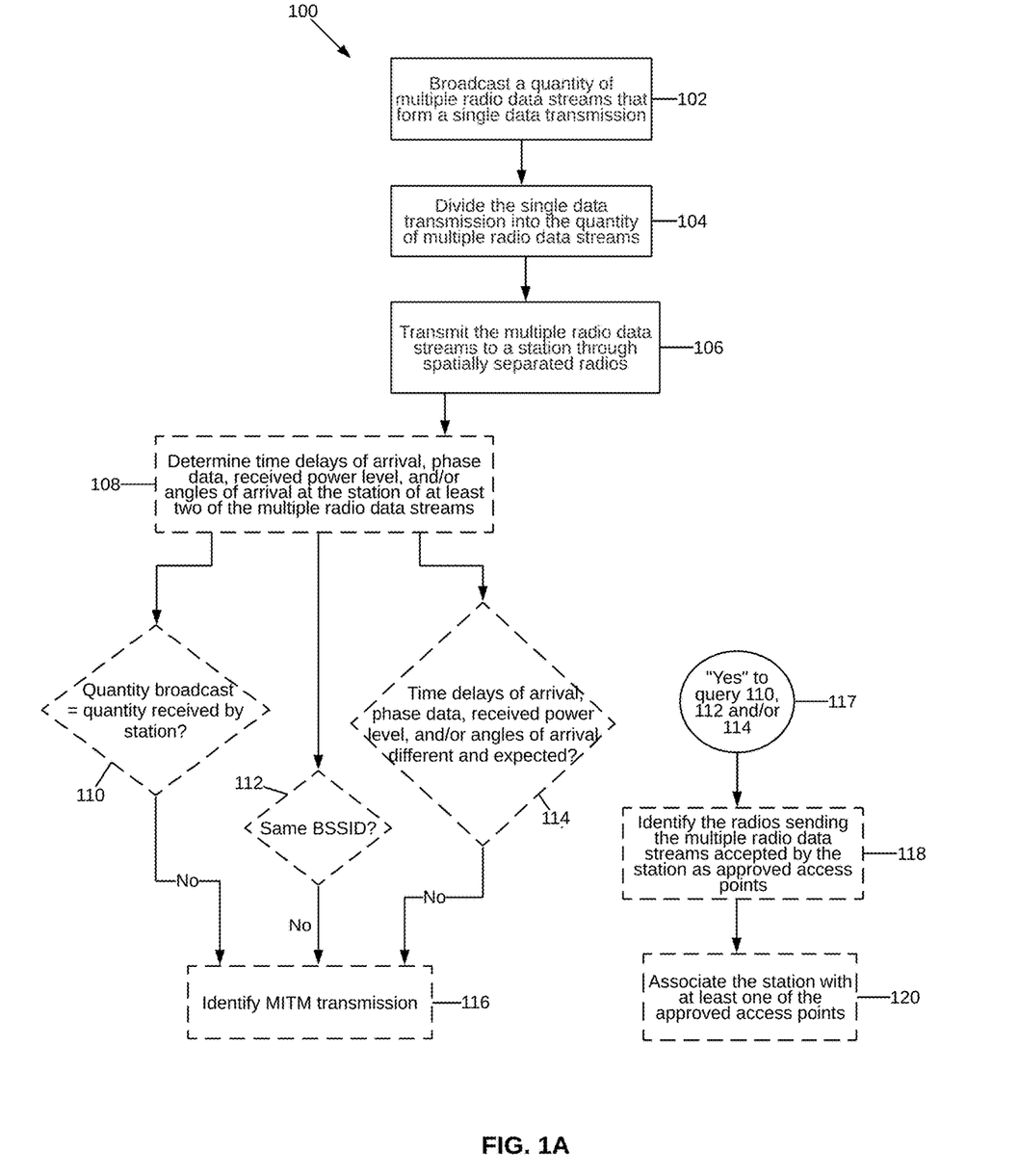
FIG. 1A is a flowchart illustrating steps in a method of using multiple radio data streams to thwart MITM transmissions, according to an embodiment.

FIG. 1A is a flowchart 100 illustrating steps in a method of using multiple radio data streams to thwart MITM transmissions. In step 102, a quantity of multiple radio data streams that form a single data transmission is transmitted, e.g., as Beacon frame information, a downlink data stream, etc. In step 104, the single data transmission is divided into the quantity of multiple radio data streams specified in step 102. In step 106, the multiple radio data streams are transmitted to a station through non-colocated radios.

Optional steps 108-116 are performed by a station receiving the multiple radio data streams. In step 108, a processor of the station (also called herein STA or receiving device) determines data arrival information such as but not limited to the time delays of arrival, phase data, received power level, and/or angles of arrival of at least two of the multiple radio data streams at multiple antennas of the station. Queries 112-114 ask whether (i) the quantity of multiple radio data streams broadcast equals the quantity of multiple radio data streams received by the station; (ii) all of the multiple radio data streams have the same BSSID transmitter address; and (iii) time delays of arrival, phase data, received power level, and/or angles of arrival of the multiple radio data streams at the station are different and expected. A station may be programmed to ask query 112, 113 and/or 114. If the answer to at least one of the queries asked is "no", the station has identified a potential MITM transmission or spoofing attempt (step 116). The transmission may then be rejected or processed as a determined threat. Depending on the level of security desired, a station may require the answer to query 112, 113 and/or 114 to be "yes" in order for the transmission to be accepted. If the answer to the required query or queries is "yes" (117), optional steps 118-120 may be performed by the station receiving the multiple radio data streams. In step 118, radios sending the multiple radio data streams that are accepted by the station are identified as approved access points. The station may then associate with at least one of the approved access points, in step 120.

Figure 1B:
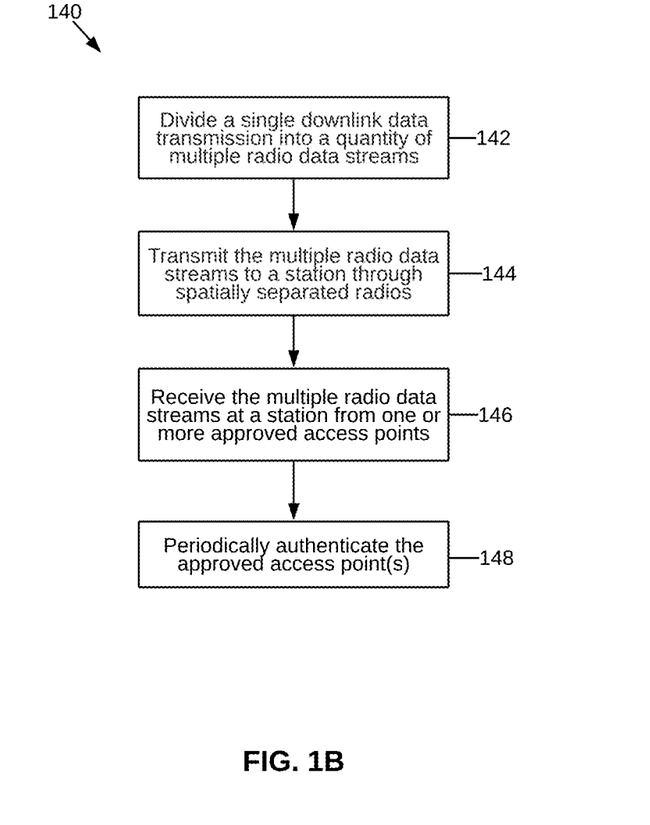
FIG. 1B is a flowchart illustrating steps in a method of receiving downlink data as multiple radio data streams.

FIG. 1B is a flowchart 140 illustrating steps in a method of transmitting and receiving downlink data as multiple radio data streams. In step 142, a single data transmission is divided into a quantity of multiple radio data streams specified for a service set. In step 144, the multiple radio data streams are transmitted to a station through non-colocated radios. In step 146, the multiple radio data streams are received at a station through one or more approved access points. The access points may be identified as approved access points as described in FIG. 1A and/or FIG. 2. The approved access points are periodically authenticated, in step 148, by repeating the method described in FIG. 1A and/or FIG. 2.

Figure 2:
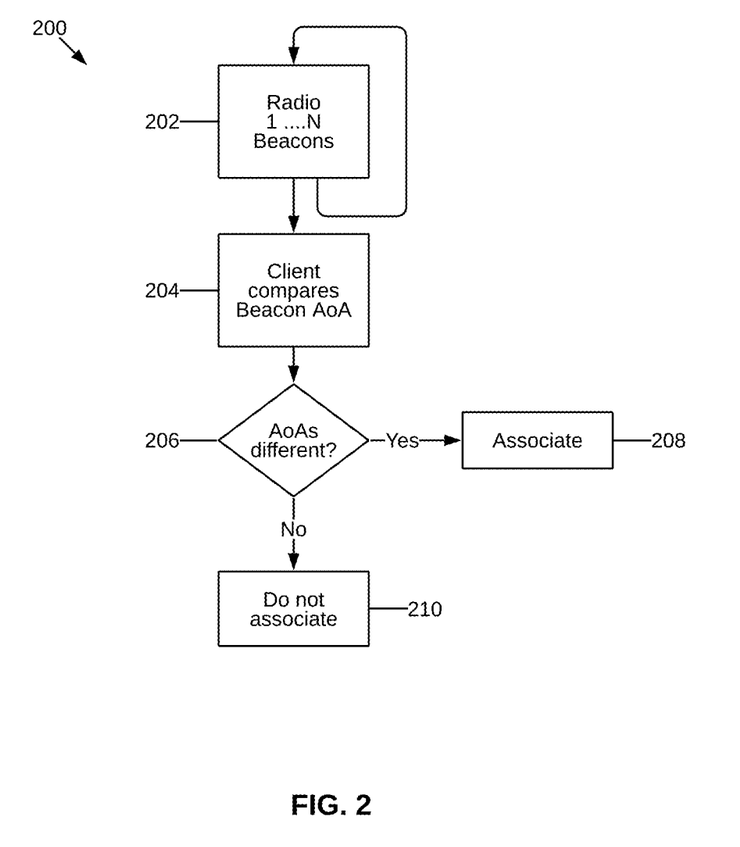
FIG. 2 is a flowchart illustrating steps in a method of identifying an approved access point, according to an embodiment.

FIG. 2 is a flowchart 200 illustrating steps in a method of identifying an approved access point. In step 202, radios 1 . . . N periodically transmit Beacon frame information notifying stations on a network of the quantity of multiple radio data streams forming a single data transmission. In step 204, a client or station (e.g., UE, STA, or similar) compares angles of arrival (AoA) of a plurality of Beacon transmissions. Step 206 is a query asking if the AoAs of the Beacon transmissions are different from one another. If the answer is "yes", the client or station has identified an approved access point with which it can safely associate, in step 208. If the answer is "no", the client or station has identified a potential MITM transmission from an unapproved access point, and it may choose not to associate with the unapproved access point, in step 210.

Figure 3A:
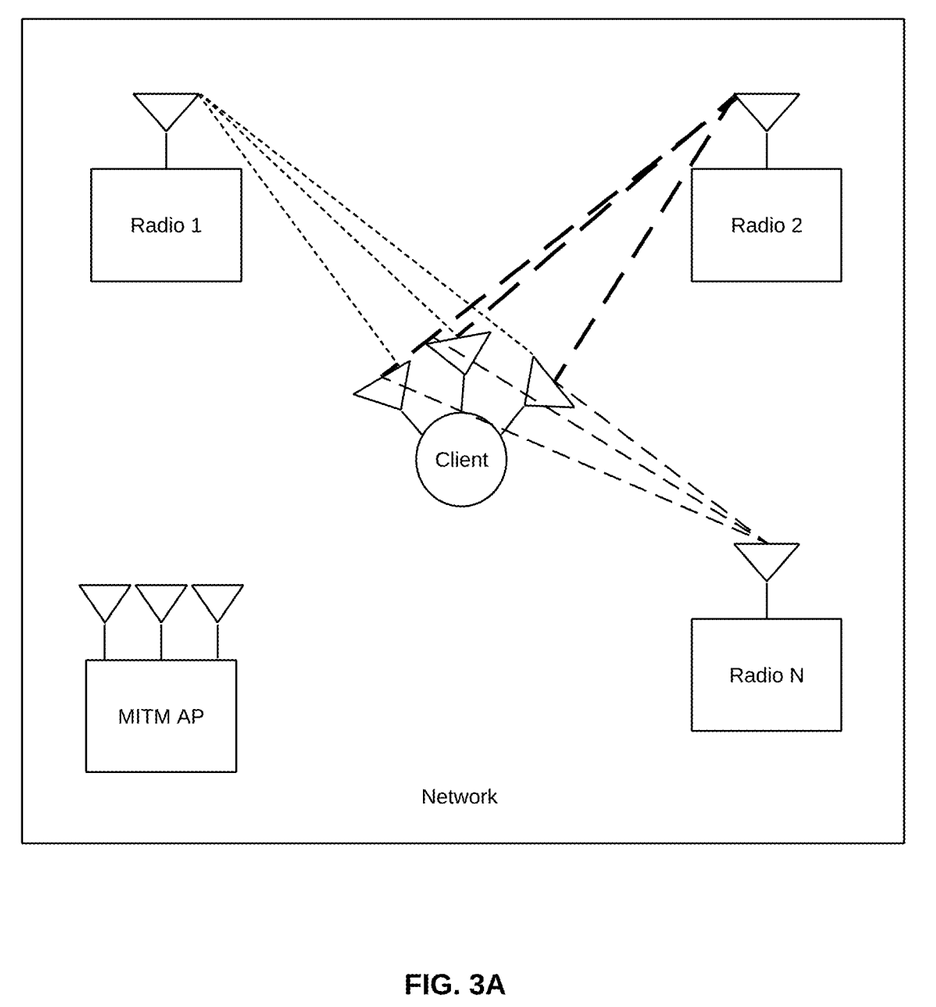
FIG. 3A illustrates a network comprising multiple APs transmitting radio data streams to a client having multiple antennas, according to an embodiment.

FIG. 3A illustrates a network comprising multiple APs (Radios 1, 2, . . . N) transmitting radio data streams (dashed lines) to a client having multiple antennas for receiving the radio data streams and determining an angle of arrival (AoA) of each data stream. Since each transmitted radio data stream will arrive at individual antennas of the client at slightly different times, the AoA can be determined by measuring the time difference of arrival (TDOA) of the data at two or more antennas. If the MITM AP shown were to transmit a radio data stream, the client would recognize the MITM transmission as increasing the overall number of data streams, and therefore violating the expected quantity of data streams, and/or as originating from an incorrect spatial location because the AoA from the MITM AP would not match an expected AoA. Further, if the MITM AP were to transmit the correct number of data streams during a period of no transmission from Radios 1-N, all of the data streams from the MITM AP would have substantially the same AoA, which would violate the expectation of spatial variability. A threshold of spatial variability may be required by the client to ensure greater spatial variability than would be achieved from closely spaced transmitters within a single device, such as the MITM AP.

Figure 3B:
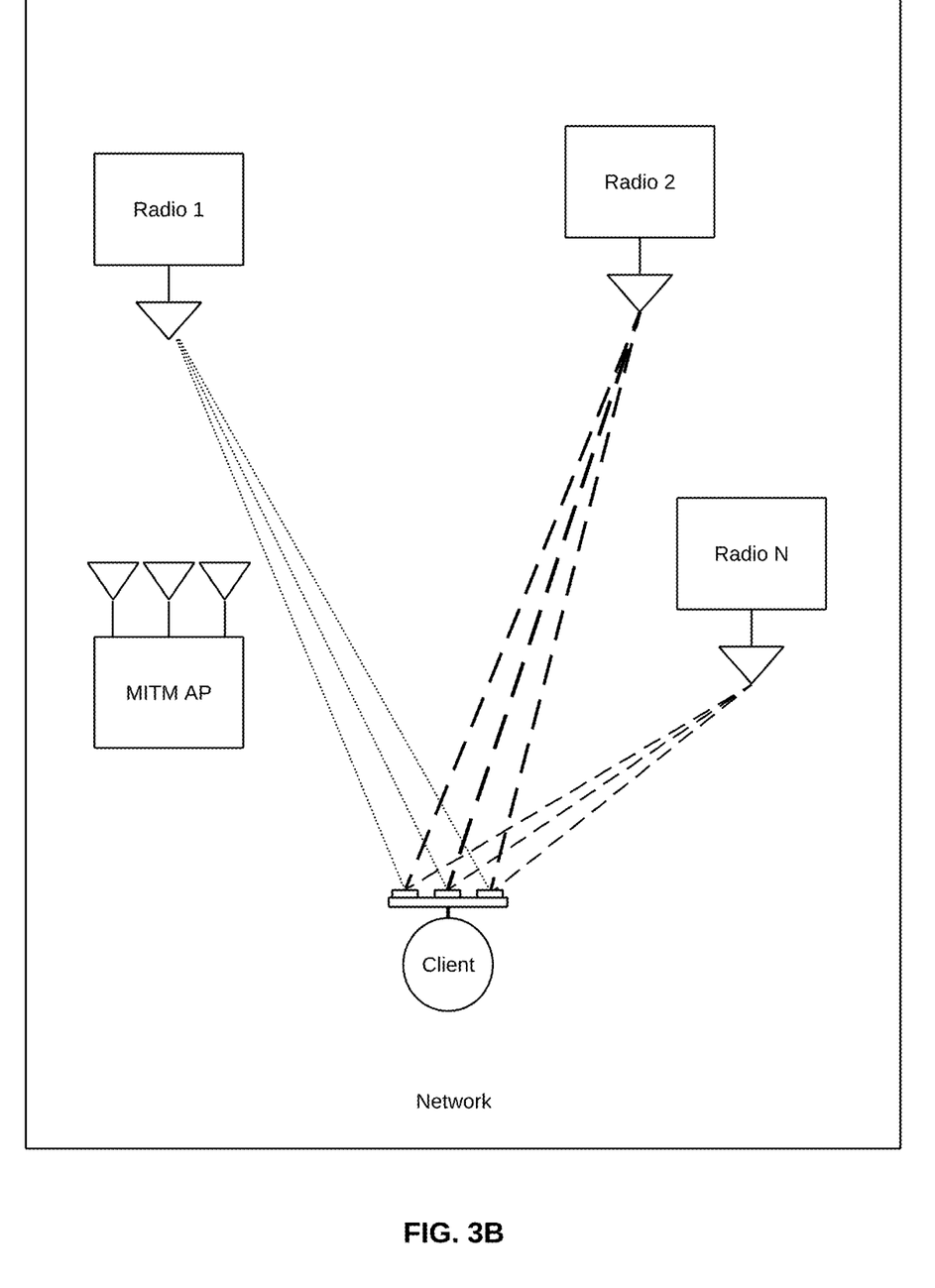
FIG. 3B illustrates a network comprising multiple APs transmitting radio data streams to a client having an antenna array, according to an embodiment.
Figure 3C:
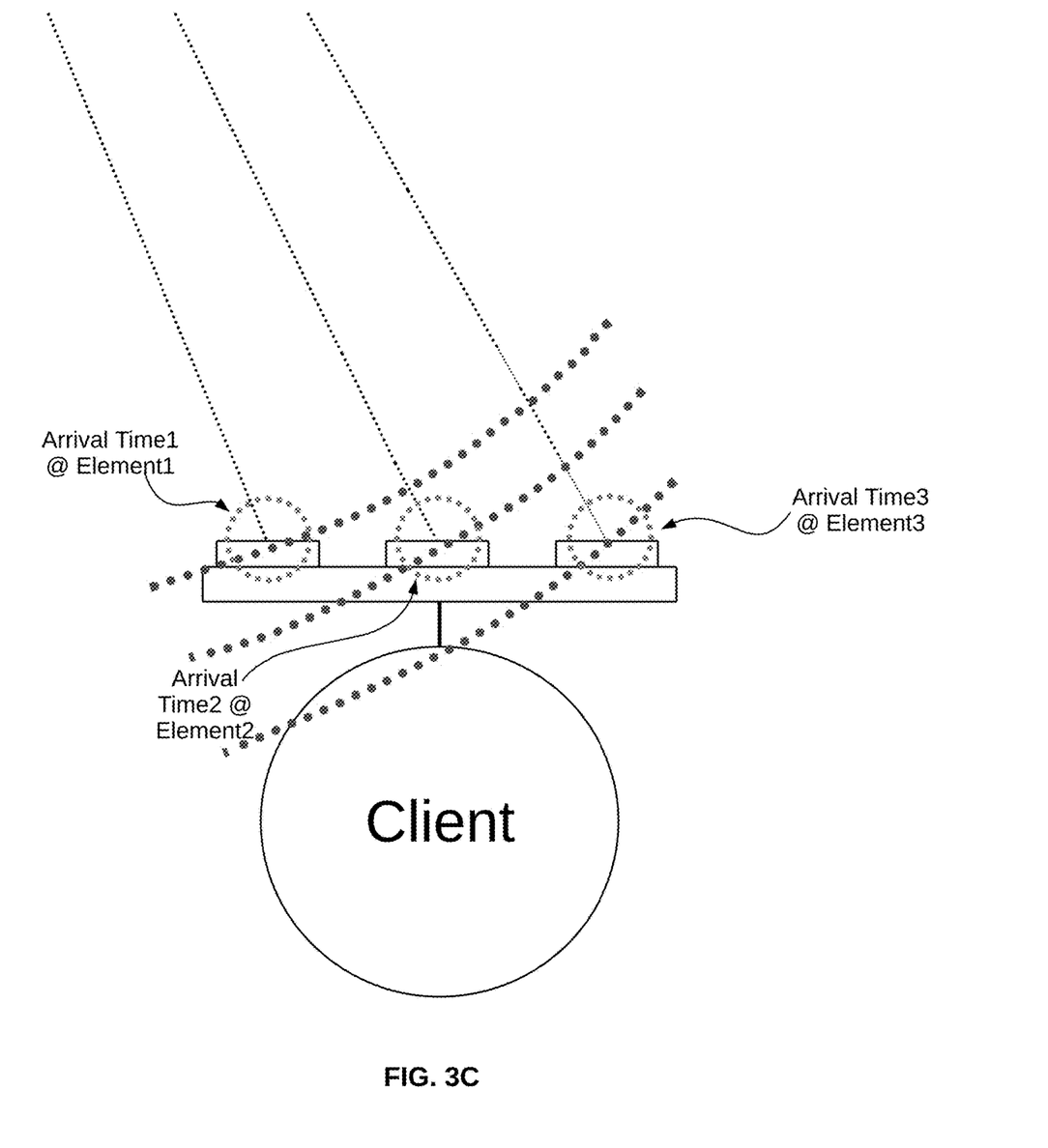
FIG. 3C shows an exploded view of a radio data stream arriving at the antenna array of FIG. 3A or FIG. 3B.

FIG. 3B illustrates a network comprising multiple APs (Radios 1, 2, . . . N) transmitting radio data streams (dashed lines) to a MIMO client having an antenna array for receiving the radio data streams and determining an angle of arrival (AoA) of each data stream. FIG. 3C shows an exploded view of the antenna array of FIG. 3A or 3B with the wavefront (dotted arches) of a radio data stream arriving at each element (circled) of the array at a slightly different time. Based on the time difference or delay of arrival of the wavefront at multiple elements, an angle of arrival of the radio data stream at the station can be determined.

Figure 3D:
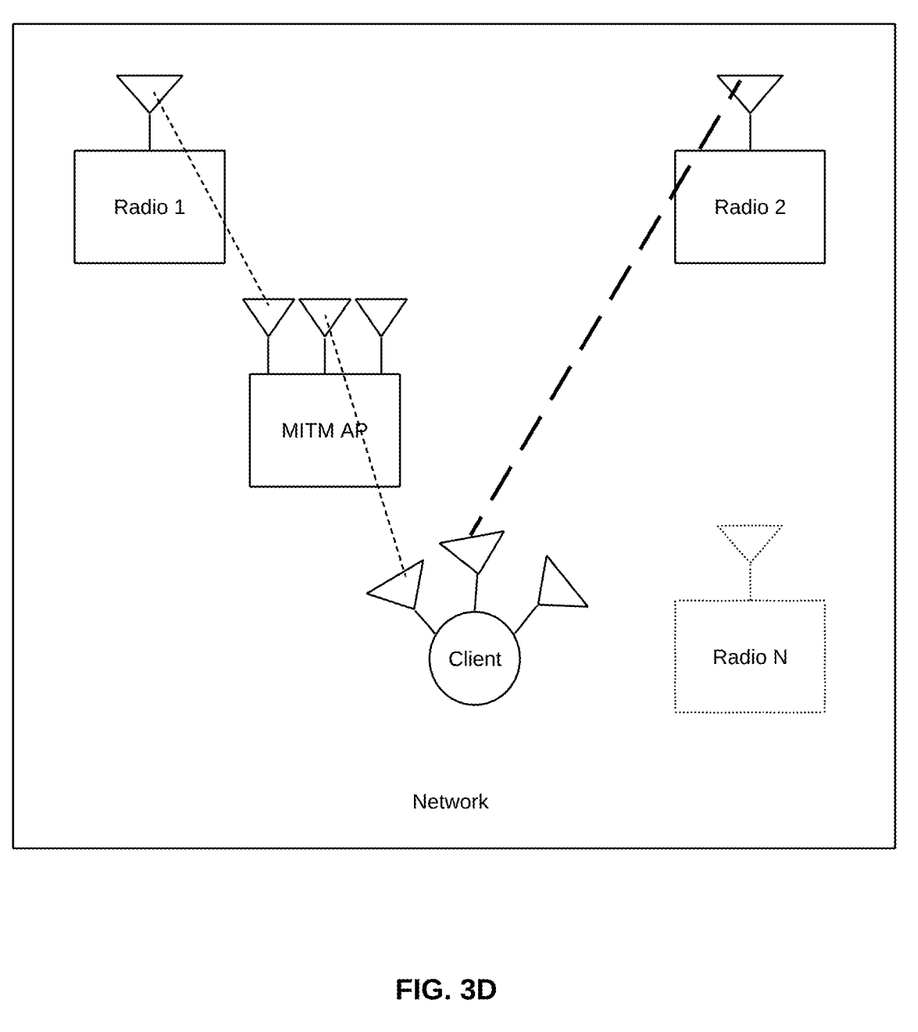
FIG. 3D illustrates an attempt by a MITM AP to intercept and retransmit a radio data stream from an approved AP.

FIG. 3D illustrates an attempt by a MITM AP to intercept and retransmit a radio data stream from an approved AP (Radio 1). However, even if the MITM AP is spatially positioned to imitate or spoof Radio 1, the time delay required to intercept and retransmit the data stream would mean the retransmitted radio data stream arrives at the client with an incorrect AoA. For example, the arrival time of the data stream from Radio 1 via the MITM AP at element 1 could be after the arrival of the data stream from Radio 2. This discrepancy in the AoA would allow the transmission to be flagged as containing a potential threat. In addition, because Radio 1 only transmits a portion of the data in a single transmission, the MITM would receive incomplete and potentially useless data.

Figure 3E:
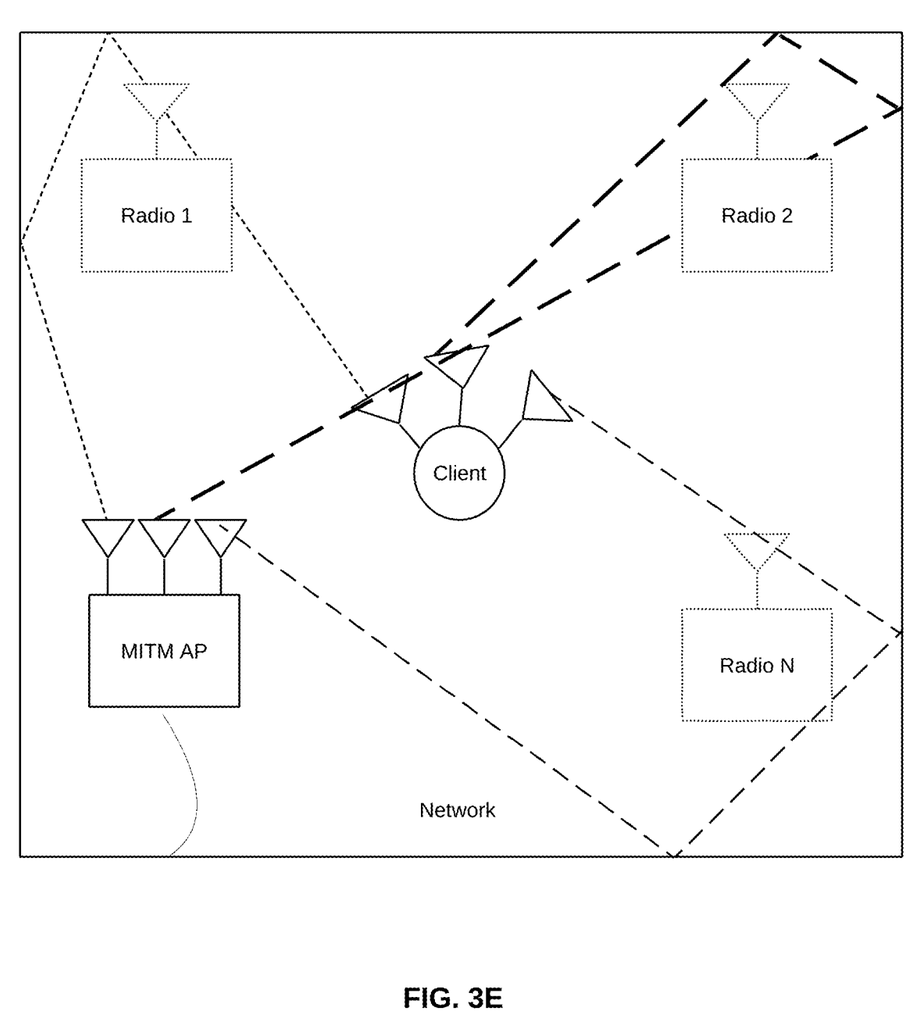
FIG. 3E illustrates an attempt by a MITM AP to transmit a radio data stream replicating the transmissions from all approved APs (Radios 1 . . . N)

FIG. 3E illustrates an attempt by a MITM AP to transmit a radio data stream replicating the transmissions from all of the approved APs (Radios 1 . . . N). The MITM AP would have to be connected to the network (dotted arc), split the single data transmission into the correct number of partial transmissions (three in the example shown), and reflect the transmissions from surfaces in the room to achieve origination positions corresponding to Radios 1 . . . N. However, even using these complicated techniques, the pathlengths of the reflected transmissions would make the time of arrival of each radio data stream at an element of an antenna array or plurality of antennas incorrect relative to an approved transmission, unless each partial transmission from the MITM AP was also staggered in time. This level of sophistication is unlikely to be achieved by the vast majority of would-be hackers.

Figure 4:
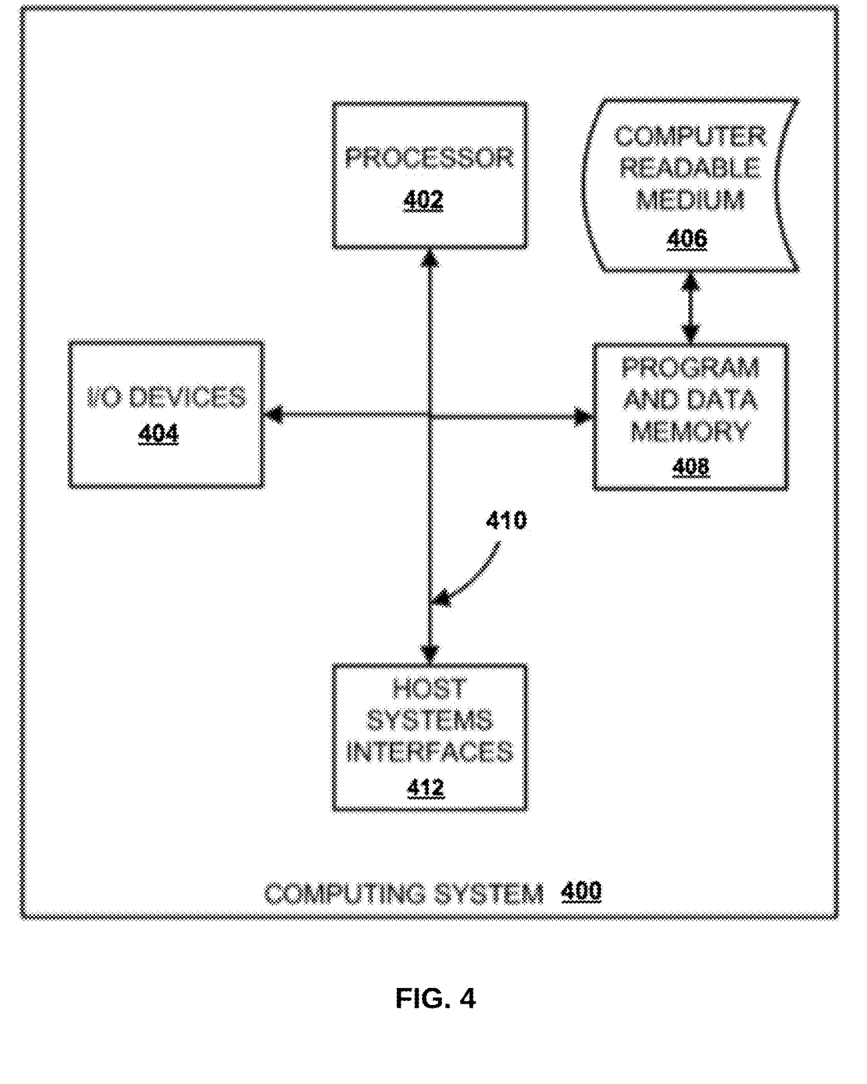
FIG. 4 is a block diagram of an exemplary computing system in which a computer readable medium provides instructions for performing methods described herein.

In an embodiment, the invention is implemented in software, which includes but is not limited to firmware, resident software, microcode, etc. FIG. 4 illustrates a computing system 400 in which a computer readable medium 406 may provide instructions for performing any of the methods disclosed herein. Furthermore, the invention can take the form of a computer program product accessible from the computer readable medium 406 providing program code for use by or in connection with a computer or any instruction execution system. For the purposes of this description, the computer readable medium 406 can be any apparatus that can tangibly store the program for use by or in connection with the instruction execution system, apparatus, or device, including the computer system 400. The medium 406 can be any tangible electronic, magnetic, optical, electromagnetic, infrared, or semiconductor system (or apparatus or device). Examples of a computer readable medium 406 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system or controller 400, suitable for storing and/or executing program code, can include one or more processors 402 coupled directly or indirectly to memory 408 through a system bus 410. The memory 408 can include local memory employed during actual execution of the program code, bulk storage, and cache memories which provide temporary storage of at least some program code in order to reduce the number of times code is retrieved from bulk storage during execution. Input/output (I/O) devices 404 (including but not limited to keyboards, displays, pointing devices, multiplexers, switches, transmitters, receivers, etc.) can be coupled to the system either directly or through intervening 1/O controllers. Network adapters may also be coupled to the system to enable the computing system 400 to become coupled to other data processing systems, such as through host systems interfaces 412, or remote printers or storage devices through intervening private or public networks. Modems, cable modem and Ethernet cards are just a few of the currently available types of network adapters.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A method of using multiple radio data streams to thwart Man-in-the-Middle (MITM) transmissions, the method comprising:
    broadcasting a quantity of multiple radio data streams that form a single data transmission;
    dividing the single data transmission into the quantity of multiple radio data streams; and
    transmitting the multiple radio data streams to a station through spatially separated radios such that when the station receives an incorrect quantity of radio data streams or spatially uniform radio data streams the station rejects the multiple radio data streams as comprising a MITM transmission.

2. The method of claim 1, wherein the quantity of multiple radio data streams is broadcast as Beacon frame information.

3. The method of claim 1, wherein the step of dividing comprises partitioning the single data stream with a Wireless Controller, Cable Modem Termination System (CMTS), Wireless Access Gateway, Serving Gateway or Public Data Network (PDN) Gateway.

4. The method of claim 1, wherein the multiple radio data streams are transmitted simultaneously or temporally staggered.

5. The method of claim 1, wherein the station is a Multiple-Input Multiple-Output (MIMO) station.

6. The method of claim 1, wherein the station comprises a multidirectional antenna or a plurality of antennas.

7. The method of claim 1, wherein the spatially separated radios are access points in a wireless computing network.

8. The method of claim 1, wherein the spatially separated radios operate on the same channel.

9. The method of claim 1, wherein the spatially separated radios have the same service set identifier (SSID).

10. The method of claim 1 further comprising determining time delays of arrival or angles of arrival at the station of at least two of the multiple radio data streams.

11. The method of claim 1 further comprising a step of accepting the multiple radio data streams at the station when:
    (i) the quantity of multiple radio data streams broadcast equals the quantity of multiple radio data streams received by the station;
    (ii) all of the multiple radio data streams have the same SSID;
    (iii) time delays of arrival or angles of arrival of the multiple radio data streams at the station are different and expected; or
    (iv) any combination of (i), (ii) and (iii).

12. The method of claim 11 further comprising:
    identifying the radios sending the multiple radio data streams accepted by the station as approved access points;
    associating the station with at least one of the approved access points; and
    transmitting uplink traffic from the station to the at least one approved access point.

13. A non-transitory computer-readable medium having a plurality of non-transitory instructions executable with a processor for using multiple radio data streams to thwart Man-in-the-Middle (MITM) transmissions, the plurality of non-transitory instructions being executable for:
    broadcasting a quantity of multiple radio data streams that form a single data transmission;
    dividing the single data transmission into the quantity of multiple radio data streams; and
    transmitting the multiple radio data streams to a station through spatially separated radios such that when the station receives an incorrect quantity of radio data streams or spatially uniform radio data streams the station rejects the multiple radio data streams as comprising a Man-in-the-Middle (MITM) transmission.

14. The non-transitory computer-readable medium of claim 13 further comprising the plurality of non-transitory instructions being executable for determining time delays of arrival or angles of arrival at the station of at least two of the multiple radio data streams.

15. The non-transitory computer-readable medium of claim 13 further comprising the plurality of non-transitory instructions being executable for accepting the multiple radio data streams at the station when:
    (i) the quantity of multiple radio data streams broadcast equals the quantity of multiple radio data streams received by the station;
    (ii) all of the multiple radio data streams have the same Service Set Identifier (SSID);
    (iii) time delays of arrival or angles of arrival of the multiple radio data streams at the station are different and expected; or
    (iv) any combination of (i), (ii) and (iii).

16. The non-transitory computer-readable medium of claim 15 further comprising the plurality of non-transitory instructions being executable for: identifying the radios sending the multiple radio data streams accepted by the station as approved access points;
    associating the station with at least one of the approved access points; and
    transmitting uplink traffic from the station to the at least one approved access point.

17. A system for generating multiple radio data streams to thwart Man-in-the-Middle (MITM) transmissions, the system comprising:
    a controller comprising a processor, memory, and a plurality of non-transitory instructions stored in the memory and executable by the processor for determining a quantity of multiple radio data streams that form a single data transmission;

an inverse multiplexer or a switch operably connected to the controller for partitioning the single data transmission into the quantity of multiple radio data streams; and a transmitter operably connected to the controller, the inverse multiplexer or the switch, wherein the transmitter is configured to broadcast the quantity of multiple radio data streams and to transmit the multiple radio data streams to a plurality of spatially separated radios.

18. The system of claim 17 further comprising a station comprising a plurality of antennas or a multidirectional antenna for receiving the multiple radio data streams from the spatially separated radios.

19. The system of claim 18 further comprising a processor, memory and a plurality of non-transitory instructions stored in the memory and executable by the processor for rejecting the multiple radio data streams, as comprising a Man-in-the-Middle (MITM) transmission, when the station receives an incorrect quantity of radio data streams or spatially uniform radio data streams.

20. The system of claim 18 further comprising a processor, memory and a plurality of non-transitory instructions stored in the memory and executable by the processor for accepting the multiple radio data streams when:
(v) the quantity of multiple radio data streams broadcast equals the quantity of multiple radio data streams received by the station;
(vi) all of the multiple radio data streams have the same SSID;
(vii) times/angles of arrival of the multiple radio data streams at one station antenna are different and expected; or
(viii) any combination of (i), (ii) and (iii).

* * * * *